US006409452B1

(12) United States Patent
Zibella et al.

(10) Patent No.: US 6,409,452 B1
(45) Date of Patent: Jun. 25, 2002

(54) ELECTRICALLY ACTUATED VEHICLE RESTRAINT APPARATUS

(75) Inventors: Michael A. Zibella, Hudson; Mark S. Lounsbury, Wassaic, both of NY (US); David P. Bresson, North Canton, OH (US); George D. Quinlan, Valatie, NY (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 09/614,352

(22) Filed: Jul. 12, 2000

(51) Int. Cl.[7] ............................................. B65G 67/02
(52) U.S. Cl. ..................................................... 414/401
(58) Field of Search .......................................... 414/401

(56) References Cited

U.S. PATENT DOCUMENTS

| | | |
|---|---|---|
| 4,861,217 A | 8/1989 | Erlandsson |
| 4,865,508 A | 9/1989 | Carlson |
| 4,988,254 A | 1/1991 | Alexander |
| 5,336,033 A | 8/1994 | Alexander |
| 5,348,437 A | 9/1994 | Krupke et al. |
| 5,505,575 A | 4/1996 | Alexander |
| 5,702,223 A | 12/1997 | Hahn et al. |
| 5,774,920 A | * 7/1998 | Alexander ............... 14/71.1 X |
| 5,784,740 A | * 7/1998 | DiSieno et al. .............. 14/71.3 |
| 5,964,572 A | 10/1999 | Hahn et al. |
| 6,062,796 A | 5/2000 | Alexander |

* cited by examiner

Primary Examiner—Steven A. Bratlie
(74) Attorney, Agent, or Firm—Gardere Wynne Sewell LLP

(57) ABSTRACT

A vehicle restraint apparatus includes a frame supporting an articulated arm assembly which is pivotable between a retracted or stored position and an extended operative position for engagement with the ICC bar or other restraint member connected to a truck or truck trailer. An electric motor driven linear actuator is connected to the arm assembly to move the arm assembly between its stored position and a working position. The linear actuator may be a power screw and nut mechanism operably connected to a tubular sleeve member which is connected at one end to the arm assembly and is sleeved over a linearly extensible member of the actuator. The actuator is operable to retract the linearly extensible member when the arm assembly is in its working position to allow floating motion of the truck or truck trailer doing loading and/or unloading operations. The arm assembly is biased into its working position by a gas spring. The apparatus includes a control system for causing the actuator to extend the arm assembly and then retract to a position to allow movement of the arm assembly. The control system responds to a control signal for storing the arm assembly to again extend the actuator, effect engagement of the actuator with the sleeve member and then retract to move the arm assembly into its stored position.

23 Claims, 6 Drawing Sheets

ELECTRICALLY ACTUATED VEHICLE RESTRAINT APPARATUS

FIELD OF THE INVENTION

The present invention pertains to a vehicle restraining apparatus and, more particularly, to a vehicle restraining apparatus having an articulated vehicle engaging arm assembly which is movable between a vehicle engaging position and a retracted position by an electric motor powered linear actuator.

BACKGROUND OF THE INVENTION

During loading and unloading of motor trucks, trailers and similar vehicles it is important that the vehicles be secured to prevent accidental movement thereof during loading and unloading operations. Motor trucks and the like are typically parked adjacent to a dock or other fixed structure during loading or unloading operations and should such vehicles roll away from the dock serious damage may occur to the vehicles and/or serious injury may occur to vehicle loading or unloading workers.

One advantageous device for restraining vehicles under the circumstances mentioned above is disclosed and claimed in U.S. Pat. No, 5,348,437 to Krupke, et al, issued Sep. 20, 1994 to the assignee of the present invention. U.S. Pat. No. 5,348,437 is incorporated herein by reference in its entirety.

However, there are many applications for vehicle restraining apparatus where an electrically actuated apparatus is preferred. It is to these ends that the present invention has been developed.

SUMMARY OF THE INVENTION

The present invention provides an improved vehicle restraining apparatus which includes an electric actuator for moving an articulated arm assembly of the apparatus between a vehicle engaging and restraining position and a retracted position to enable the vehicle to be moved into a position adjacent a loading dock or away from the loading dock.

The vehicle restraining apparatus in accordance with the invention includes a linear actuator preferably driven by an electric motor for moving an articulated arm assembly between a retracted or stored position and a working position for engaging the vehicle to be restrained. A preferred embodiment of the linear actuator includes a motor driven screw and nut assembly operably connected to a linearly extensible member for moving the arm assembly between working and retracted positions. The linearly extensible member of the actuator is automatically retracted out of a position in forcible engagement with the articulated arm assembly to permit the vehicle connected to the restraining apparatus to "float" during loading and/or unloading operations to prevent damage to the restraining apparatus actuating mechanism. Upon command to retract the vehicle restraining apparatus out of engagement with the vehicle the linear actuator is moved to a position to engage a member connected to the articulated arm assembly to retract the articulated arm assembly into its stored or retracted position.

The present invention also provides an improved vehicle restraining apparatus which is operated by an electrically operated actuator and which further includes an improved control system for controlling movement of the apparatus between working and stored positions.

Those skilled in the art will further appreciate important advantages and superior features of the invention upon reading the detailed description which follows in connection with the drawings.

DETAILED DESCRIPTION OF A PREFERRED EMBODIMENT

Figure 1:
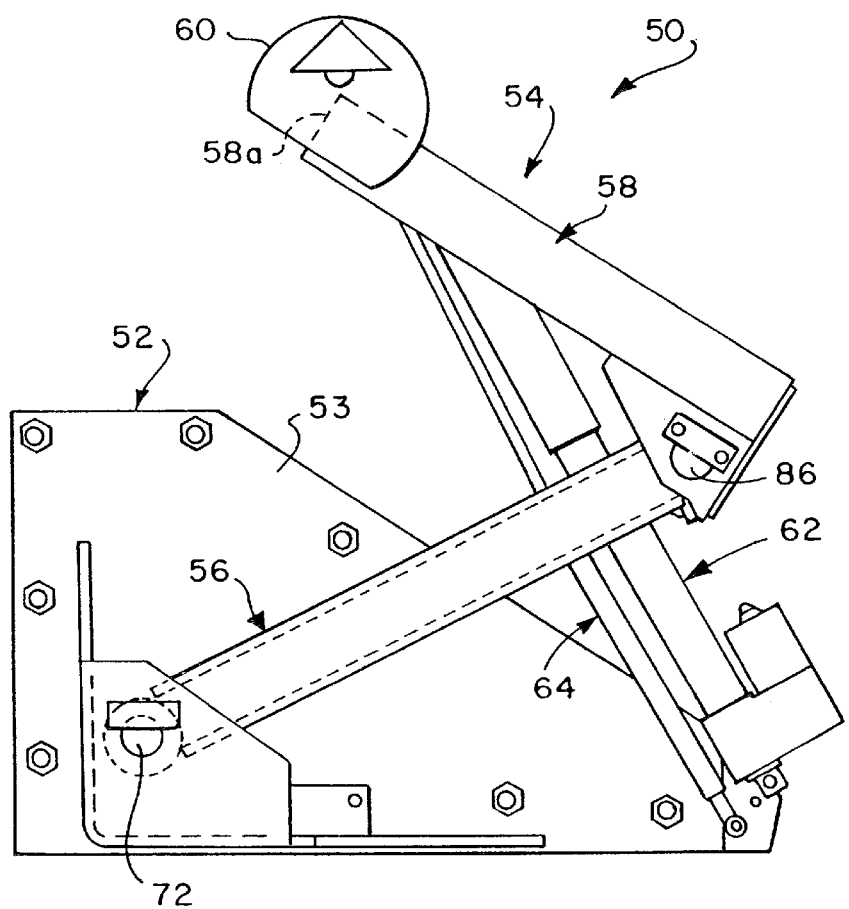
FIG. 1 is a front elevation of the vehicle restraining apparatus of the present invention showing the apparatus in an extended or working position.

In the description which follows like parts are marked throughout the specification and drawing with the same reference numerals, respectively. The drawing figures are not necessarily to scale and certain features may be shown in generalized or schematic form in the interest of clarity and conciseness.

Referring to FIG. 1, there is illustrated an improved vehicle restraining apparatus in accordance with the present invention and generally designated by the numeral 50. The apparatus 50 includes a frame 52 adapted to be mounted adjacent a vertical dock wall and on a dock loading ramp in the manner described in U.S. Pat. No. 5,348,347. The apparatus 50 includes an articulated arm assembly 54 including a lower arm assembly 56 and an upper arm assembly 58 which are pivotally connected to each other. The lower arm assembly 56 is pivotally supported on the frame 52 for articulation to the positions shown whereby a hook member 60 mounted on the upper arm assembly 58 may be positioned to engage the ICC bar, for example, of a motor truck or truck trailer, not shown, to restrain same from moving away from a loading dock associated with the restraining apparatus 50.

Figure 2:
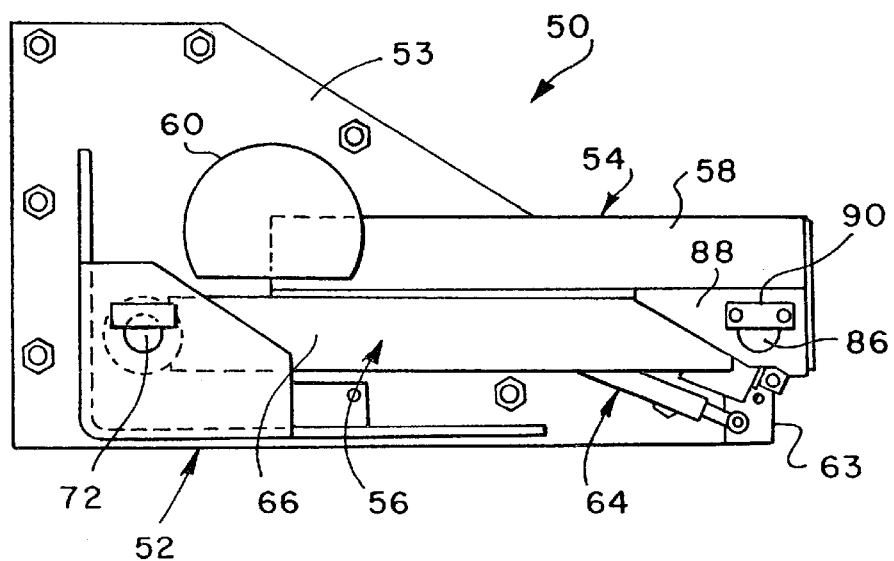
FIG. 2 is a front elevation of the apparatus shown in FIG. 1 in a retracted or stored position.

As shown in FIG. 1, in particular, the apparatus 50 also includes a linearly extensible actuator 62 which is preferably operated by an electric motor to extend the articulated arm assembly 54 to the position shown in FIG. 1 and to also retract the arm assembly to the storage or retracted position shown in FIG. 2. Still further, the apparatus 50 includes a resilient biasing member 64 for biasing the articulated arm assembly 54 to the position shown in FIG. 1 while allowing the arm assembly to pivot with respect to frame 52 and to also allow the lower and upper arm assemblies 56 and 58 to pivot with respect to each other. A preferred form of resilient biasing member 64 is a linearly extensible gas spring adapted to be connected to the frame 52 and operably connected to the articulated arm assembly 54 generally at the distal end 58a of the upper arm assembly 58.

Figure 3:
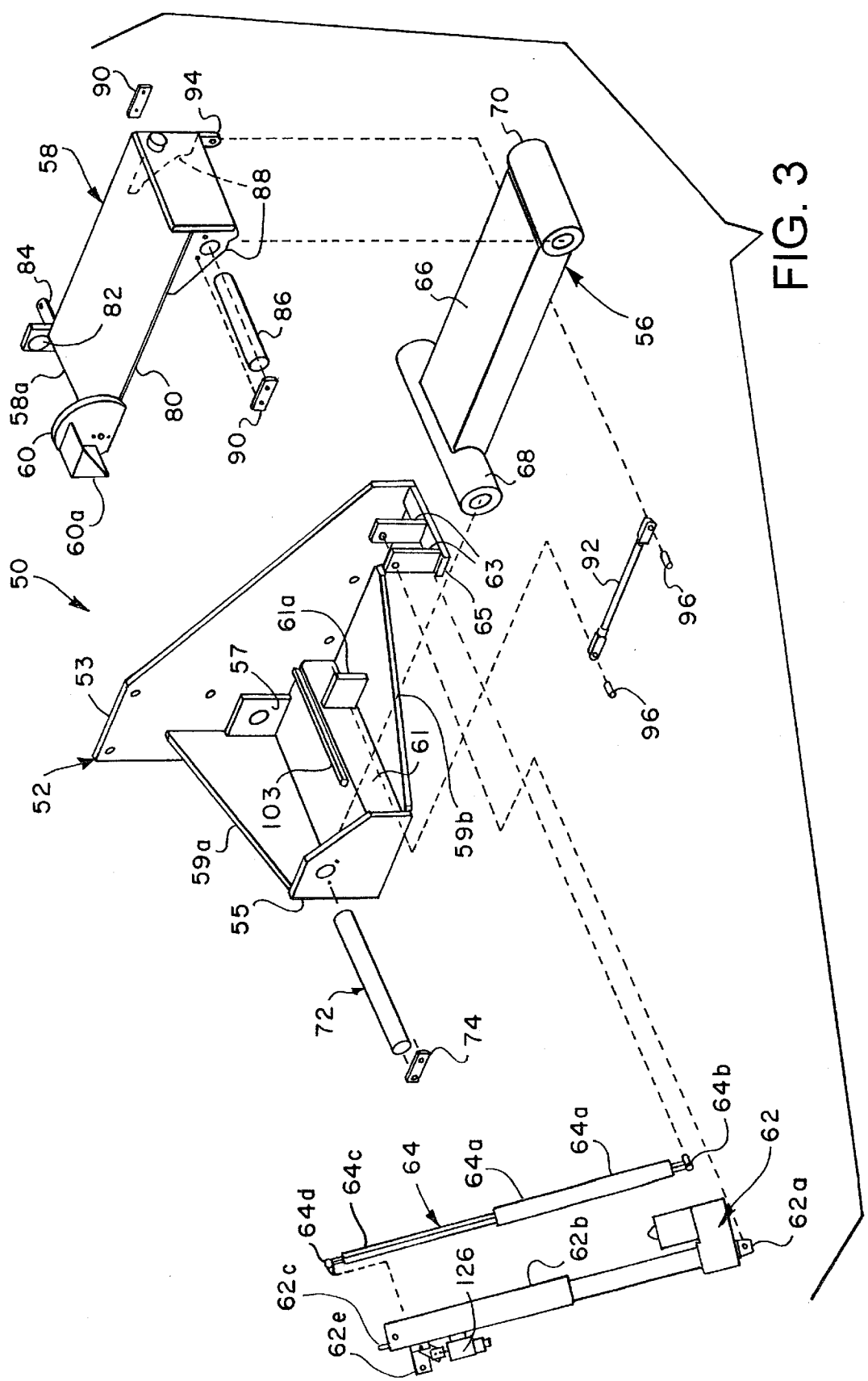
FIG. 3 is an exploded perspective view of substantially all of the components of the apparatus of the present invention.

Referring now to FIG. 3, the frame 52 includes a vertical wall plate 53 and spaced apart pivot pin support plates 55 and 57 which are supported by gusset members 59a, 59b and 61. Frame 52 also includes spaced apart clevis brackets 63 connected to the wall plate 53 by a support plate 65. Lower arm assembly 56 includes an elongated generally rectangular tubular arm member 66 which is suitably secured to or formed integral with spaced apart parallel and generally cylindrical bearing members 68 and 70. Bearing member 68 is operable to receive a pivot pin 72 through its bearing bore, which pivot pin is also adapted to be supported at its opposite ends by the support plates 55 and 57 and retained therein by a suitable retainer 74. Retainer 74 is operable to be releasably secured to support plate 55 by suitable fasteners, not shown in FIG. 3.

Referring further to FIG. 3, the upper arm assembly 58 includes a generally rectangular tubular beam arm member 80 supporting the hook 60 and a reflector 82 opposite the hook 60 both at distal end 58a of the upper arm assembly 58, as shown. The distal end 58a of upper arm assembly 58 also includes a laterally projecting actuator connector pin 84 formed thereon for connection to a part of actuator 62 to be described further herein, see FIG. 4 also. Upper arm assembly 58 is pivotally connected to lower arm assembly 56 by a pivot pin 86 which extends through suitable bores formed in opposed spaced apart gussets 88 forming part of upper arm assembly 58. Pivot pin 86 also projects through a suitable bore formed in bearing member 70 of lower arm assembly 56. Pivot pin 86 is suitably retained connected to the lower and upper arm assemblies 56 and 58 by opposed retainers 90 which are adapted to be releasably connected to the gussets 88 by suitable fasteners, not shown. An adjustable link 92 is adapted to be connected to frame 52 at a frame plate 61a and to the upper arm assembly 58 at a depending projection 94 by suitable pivot pins 96, respectively. The adjustable link 92 aids in elevating and retracting the upper arm assembly 58 as the articulated arm assembly 54 moves between the positions shown in FIGS. 1 and 2.

Figure 4:
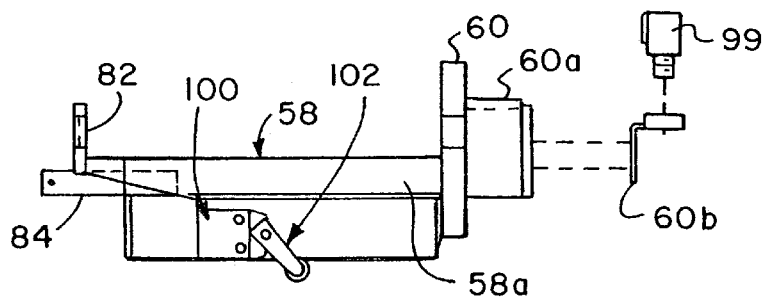
FIG. 4 is a detail transverse end view of the upper arm assembly showing additional components which are mounted on the upper arm assembly.

Referring further to FIGS. 3 and 4, the hook part 60 includes a bracket 60a adapted to support a bracket 60b for a photoelectric sensor 99, FIG. 4, adapted to project a beam toward reflector 82 to detect the presence or absence of the ICC bar of a truck or a truck trailer during operation of the apparatus 50. FIG. 4 also illustrates a limit switch 100 mounted on upper arm assembly 58 and including a movable switch arm 102 supported thereon.

Referring again to FIG. 3, the linear actuator 62 is shown as well as the gas spring 64. Actuator 62 is connected to he frame 52 at a tang 62a which is pivotally connected to the clevis brackets 63 by suitable pivot means, not shown. Actuator 62 also includes an outer linearly extensible tubular sleeve member 62b, the distal end of which is connected to connector pin 84 as will be further explained hereinbelow. Gas spring 64 includes a cylinder member 64a which is adapted to be connected at its lower end 64b to one of the clevis brackets 63. The opposite end of gas spring 64 includes a linearly extensible piston rod 64c suitably connected at its distal end 64d to a bracket 62e, see FIG. 5 also, supported on the tubular sleeve member 62b of actuator 62. A proximity switch 62c is suitably mounted on the distal end of the sleeve member 62b, as shown in FIG. 3, and will be further discussed herein. Accordingly, in response to energization of actuator 62 articulated arm assembly 54 may be moved between the positions shown in FIGS. 1 and 2 and may be urged into the position shown in FIG. 1 by the gas spring 64 to accommodate any vertical "floating" motion of a truck bed or truck trailer engaged by the upper arm assembly 58 during loading or unloading operations.

Figure 5:
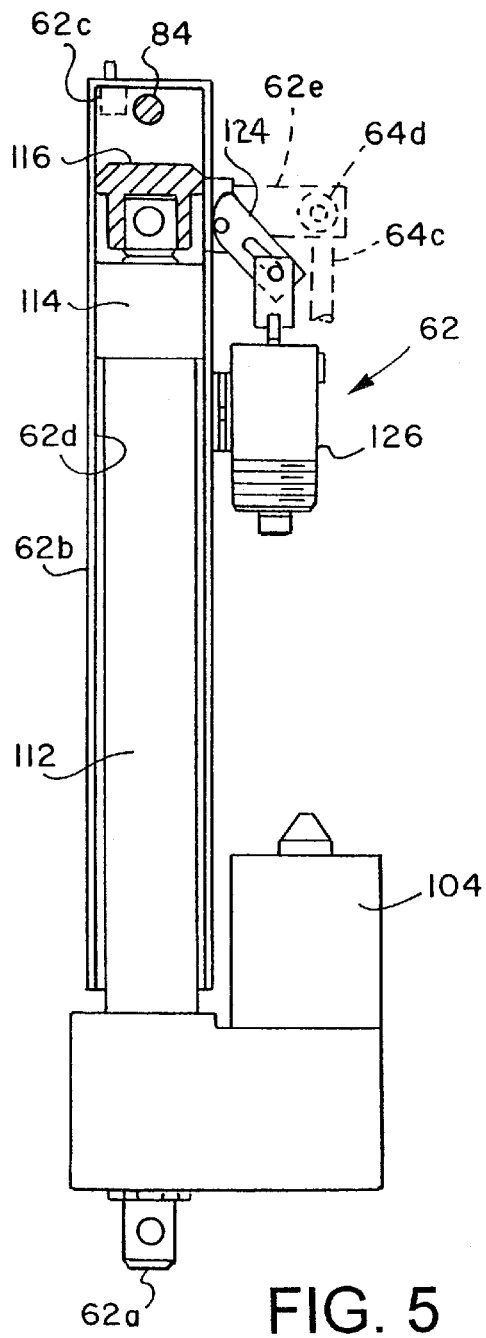
FIG. 5 is a side elevation view, partially sectioned, of the electric actuator showing the arm assembly retraction solenoid and finger in an inactive position.
Figure 6:
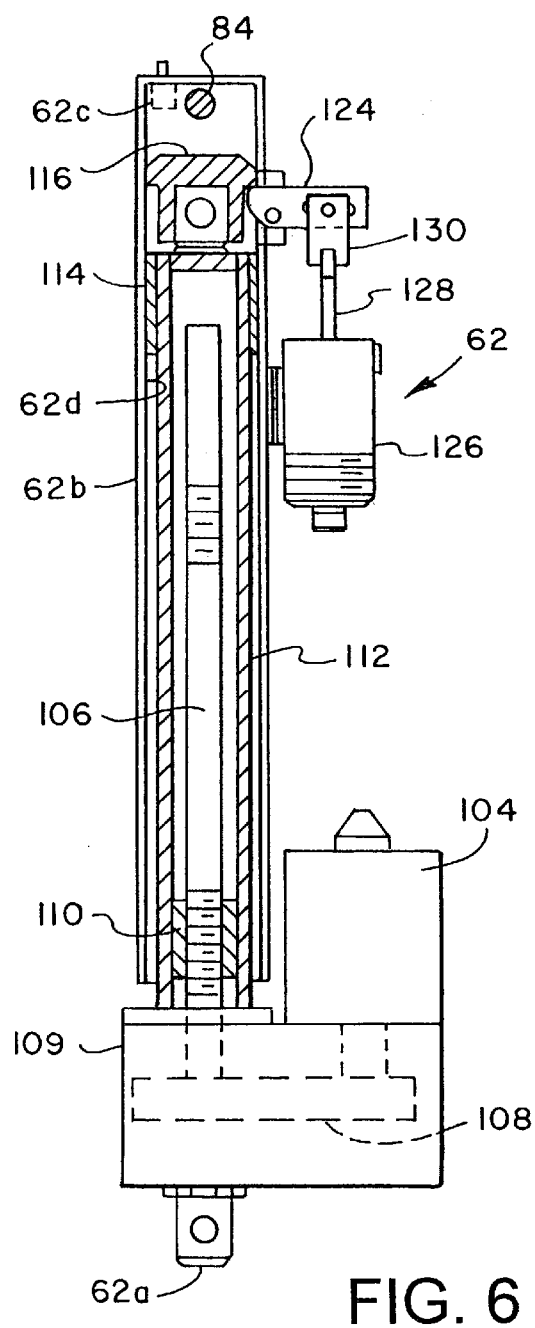
FIG. 6 is a section view of the actuator shown in FIG. 5 illustrating further details and also showing the retraction solenoid and finger in an actuated or working position.

Referring now to FIGS. 5 and 6, the actuator 62 includes a reversible electric motor 104 operable to be drivably connected to an elongated rotatable power screw 106, FIG. 6, by way of suitable mechanical power transmission means 108. Power screw 106 is suitably supported for rotation on an actuator housing 109. Power screw 106 is operably engaged with a threaded member or nut 110 which is connected to a linearly extensible cylindrical tubular member 112, FIG. 6, for linear extension and retraction with respect to the power screw 106. Linearly extensible member 112 includes a suitable sleeve bearing 114 disposed on and secured to the outer surface of its distal end and adapted to slidably support the linearly extensible tubular sleeve member 62b. Bearing 114 includes a generally square cross sectional shape and tubular sleeve 62b also is provided with a cooperating, generally square cross section bore 62d. Linearly extensible member 112 also includes a square cross section head member 116 secured thereto and including a laterally projecting flange portion 116a, see FIG. 7 also, and is operable to be snugly fitted within but slidable relative to the outer tubular sleeve member 62b.

Figure 7:
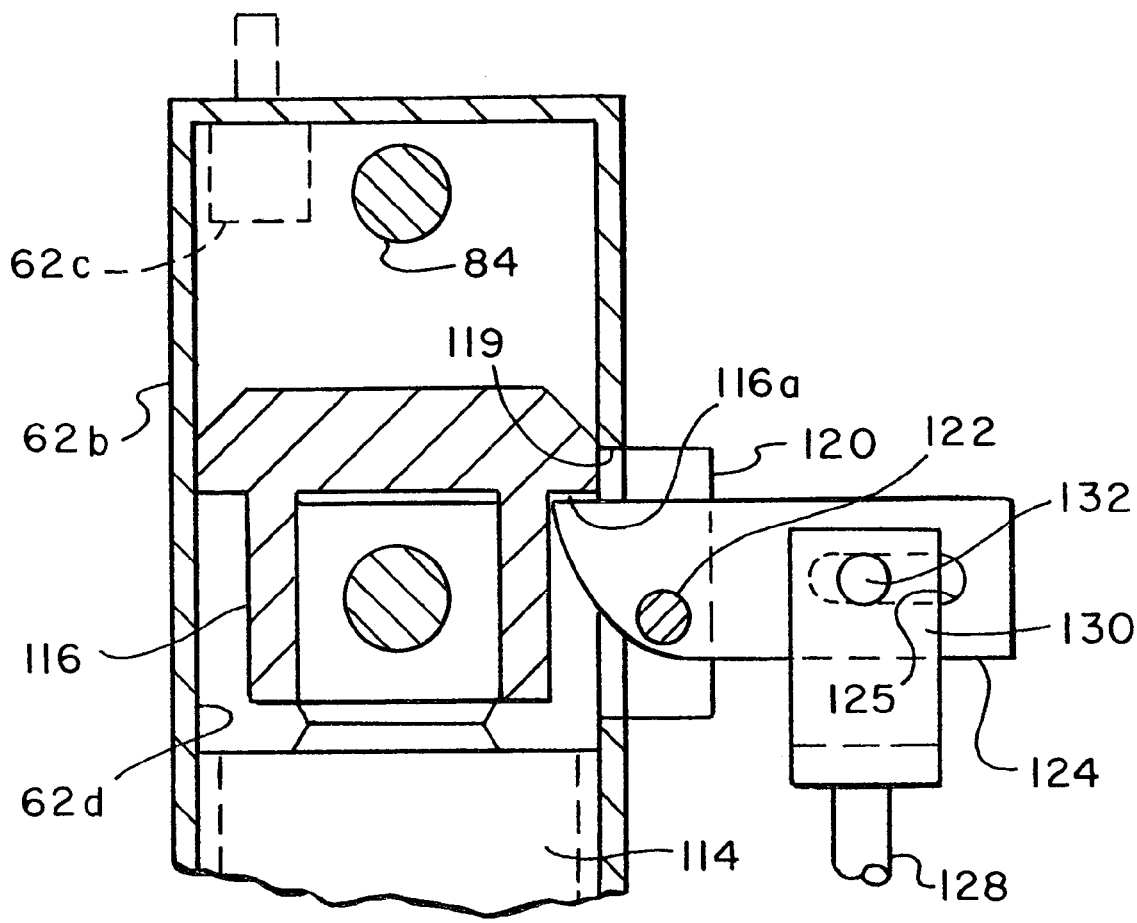
FIG. 7 is a detail view on a larger scale of the actuator retraction finger in its working position.

Referring further to FIG. 7, outer tubular sleeve member 62b includes a longitudinal slot 119 formed therein and adjacent a bracket part 120 mounted on sleeve member 62b for supporting a pivot pin 122 for a pivotable latch finger 124 which is operable to project into the interior of tubular sleeve member 62b. Finger 124 is adapted to be engaged with the flange 116a of head member 116 when moved to the position shown in FIG. 7. However, latch finger 124 may also moved to the position shown in FIG. 5 to be out of a position which would result in engagement with the head 116.

Referring further to FIGS. 5, 6 and 7, a solenoid type linear actuator 126 is mounted on tubular sleeve member 62b and is connected to finger 124 by way of linearly movable actuator rod 128 and a clevis 130 mounted on the distal end thereof. Clevis 130 includes a suitable pin 132, FIG. 7, which projects through an elongated slot 125 formed in latch finger 124. In response to actuation of the solenoid actuator 126, the finger 124 may be moved between the retracted position shown in FIG. 5 and the extended position shown in FIGS. 6 and 7 to engage the head 116 so that when the screw 106 is rotated to retract the linearly extensible member 112 to the position shown in FIGS. 5, 6 and 7, the outer tubular sleeve member 62b will also be retracted with the member 112. However, when the finger 124 is in the position shown in FIG. 5, out of possible engagement with the head 116, the linearly extensible member 112 together with the head 116 may be retracted substantially to the position shown in FIGS. 5, 6 and 7 while the member 62b may move in telescoping relationship to the member 112 to allow the arm assembly 54 to articulate to accommodate any floating motion of the truck or truck trailer, as previously mentioned, without disengaging from the arm assembly 58 and hook 60.

Accordingly, when the vehicle restraining apparatus 50 is in the position shown in FIG. 2, and it is desired to move the arm assembly 54 to the position shown in FIG. 1 for engagement with an ICC bar, not shown, of a truck or truck trailer, for example, solenoid actuator 126 will be in a condition to provide for positioning the finger 124 in the position shown in FIG. 5. Upon energization of the motor 104 and rotation of screw 106 linearly extensible member 112 will be extended with respect to motor 104 to move the articulated arm assembly 54 from the position shown in FIG. 2 to the position shown in FIG. 1. This movement may be assisted by gas spring 64. Typically, the member 112 will move relative to the sleeve member 62b until the head 116 engages pin 84 before the articulated arm assembly 54 will move toward the position shown in FIG. 1.

Once the arm assembly 54 has been extended so that the upper arm assembly 58 is engaged with an ICC bar or a similar restraint structure of a truck bed or truck trailer, motor 104 is driven in the reverse direction to retract the linearly extensible member 112 back to the position shown in FIGS. 5 and 6 while finger 124 is retained in the position shown in FIG. 5. With the head 116 retracted a substantial distance from the pin 84 and the distal end of sleeve member 62b, the articulated arm assembly 54 is free to pivot about pivot pins 72 and 86 to accommodate vertical "floating" motion of the truck bed or truck trailer. However, the articulated arm assembly 54 will be urged into engagement with the aforementioned ICC bar by the gas spring 64.

When it is desired to retract the restraint apparatus 50 to the position shown in FIG. 2 so that the hook 60 is moved clear of the aforementioned ICC bar, actuator motor 104 is again driven in a direction which will result in the linear extension of member 112 back to a position in engagement with pin 84 and in proximity of head 116 to switch 62c. Solenoid actuator 126 will then be energized to move the finger 124 to the position shown in FIGS. 6 and 7 followed by energization of the motor 104 in the opposite direction of rotation to begin retracting the member 112 toward the position shown in FIGS. 6 and 7, whereupon the finger 124 will engage the flange 116a of head 116. Upon continued rotation of the power screw 106, the tubular sleeve member 62b will travel toward the retracted position with the member 112. In this way the articulated arm assembly 54 will be returned to the position shown in FIG. 2, so that the hook 60 is moved clear of any restraint structure associated with a truck bed or truck trailer, such as the aforementioned ICC bar.

Those skilled in the art will appreciate that the actuator 62 is somewhat exemplary. The screw 106 could be associated with the member 112 and linearly extensible therewith whereas the nut 110 may be fixed for rotation but not linear extension on the actuator 62. Moreover, other types of actuators which include a linearly extensible member similar to the member 112 may be utilized. However, a preferred embodiment of a linearly extensible actuator such as the actuator 62, is illustrated. One commercial source for the actuator 62 is Warner Electric Company. A preferred source of the gas spring 64 is Suspa Incorporated, Grand Rapids, Mich. as their model 16-4-373-300-A14A-B14A-725N.

Figure 8A:
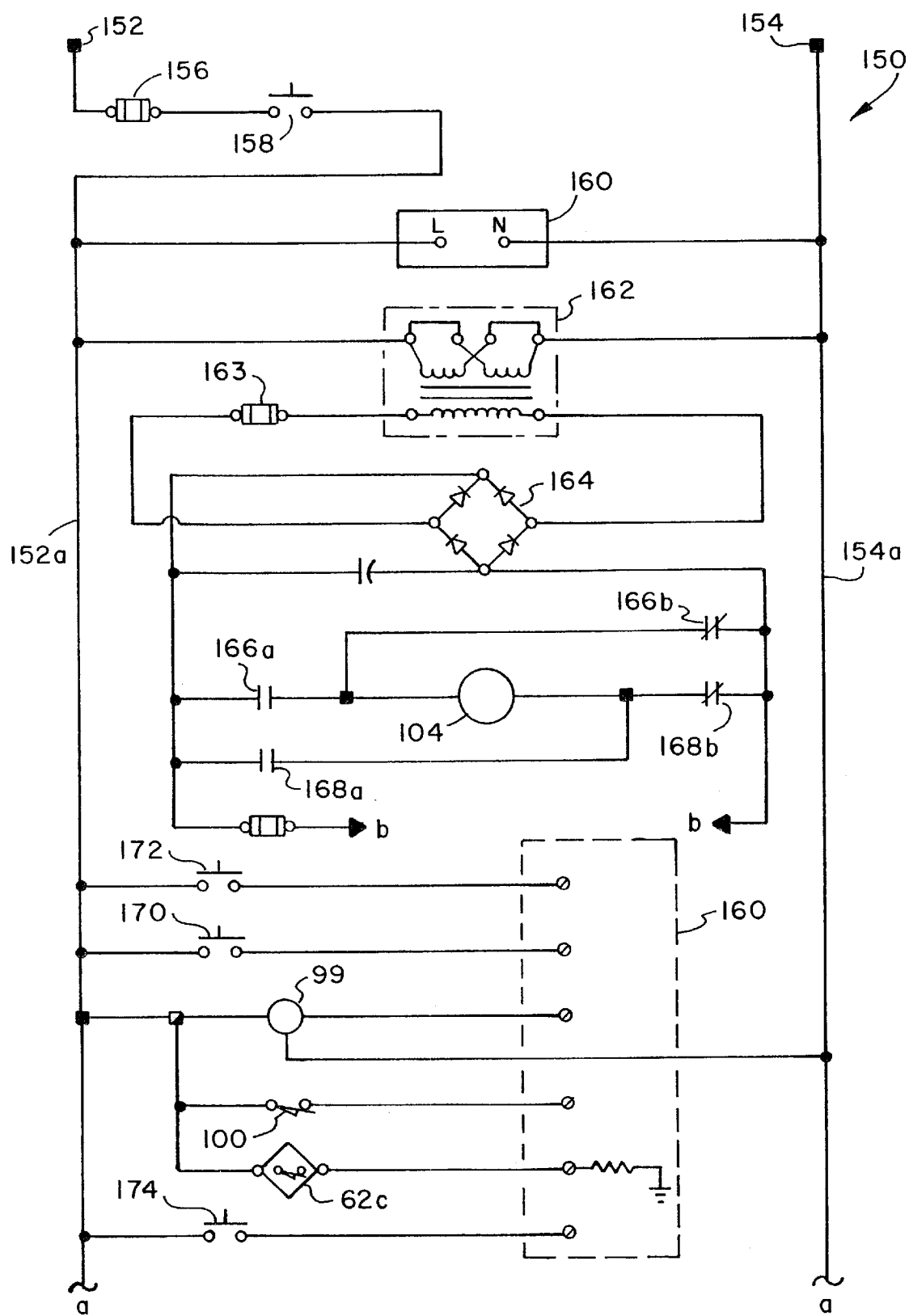
FIG. 8A is a portion of a schematic diagram of the control system for the apparatus of the present invention.
Figure 8B:
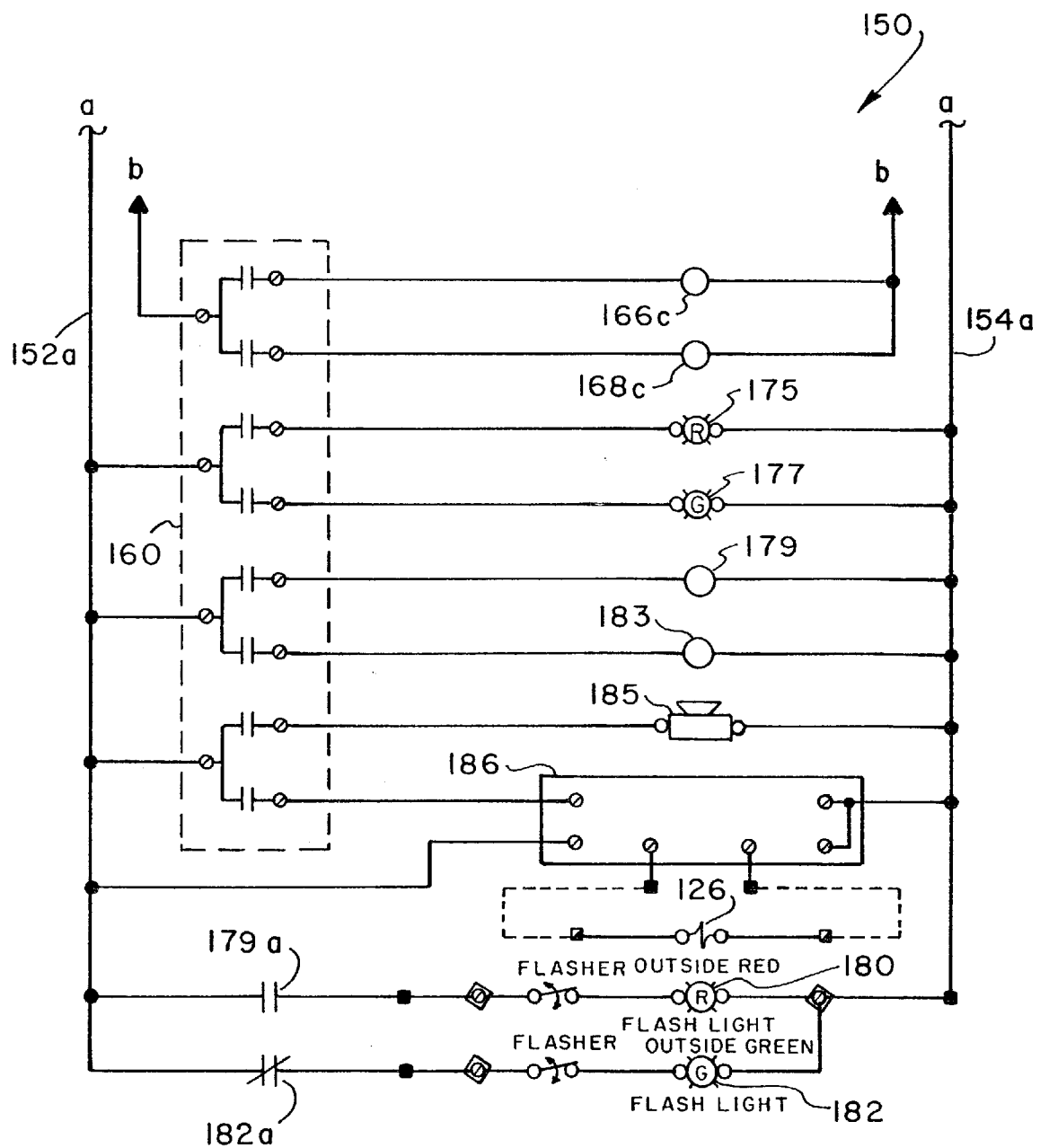
FIG. 8B is a further portion of the schematic diagram of the control system.

Referring now to FIGS. 8A and 8B, a preferred embodiment of a control system for the vehicle restraint apparatus 50 is illustrated. The control system for the apparatus 50 is generally designated by the numeral 150 and is illustrated in the form a so-called ladder type schematic diagram wherein, for example, 115 volt AC electrical power is applied to terminals 152 and 154 for conductors 152a and 154a. FIGS. 8A and 8B are intended to be read together wherein FIG. 8B is a continuation of FIG. 8A from points a—a and b—b. The circuitry of control system 150 includes a master fuse 156 and master power switch 158. Closure of switch 158 supplies power to a programmable logic controller (PLC) 160 which may be of a type commercially available. 115 volt AC electrical power is also supplied to a transformer 162 for conversion to 12 volt AC power which is supplied via fuse 163 to a rectifier 164. Rectifier 164 provides 12 volt DC power to motor 104 via relay contacts 166a, 166b and 168a, 168b.

FIG. 8A shows connection points to the PLC 160 of several components including a push button switch 170 which is operable to be actuated to raise the restraint apparatus 50 from the position shown in FIG. 2 to the position shown in FIG. 1. A push button switch 172 is operably connected to the PLC 160 to effect operation of the restraint apparatus 50 to move to the position of FIG. 2. The photosensor 99 is also indicated to be operably connected to the power supply circuit and to the PLC 160 to provide a suitable signal thereto indicating the presence or absence of an ICC bar engaged with the upper arm assembly 58 between the hook 60 and the reflector 82. Still further, the control system 150 includes the limit switch 100, as shown in FIG. 8A which provides a signal to the PLC 160 when the articulated arm assembly 54 is in the retracted or stored position shown in FIG. 2. Under these circumstances the switch arm 102 will engage a member 103 on frame 52, see FIG. 3.

Still further, referring to FIG. 8A, the diagram for the control system 150 shows the proximity switch 62c which provides a signal to the PLC 160 indicating that the head 116 is in a position in engagement with pin 84 or at least clear of the slot 119 sufficiently to permit rotation of the finger 124 into the position shown in FIG. 7. FIG. 8A also illustrates a key operated switch 174 which may be actuated to cause the PLC 160 to provide predetermined light signals for signal lights to be described further herein under the circumstances wherein the truck trailer or truck bed does not have a suitable structure, such as an ICC bar, for the apparatus 50 to engage and restrain from movement during cargo loading and/or unloading operations.

Referring to FIG. 8B, the PLC 160 includes an output relay circuit operable to use both 12 volt DC and 115 volt AC power to supply power to certain relays associated with control system 150. For example, the PLC 160 is operable to provide 12 volt DC power to a coil 166c of relay 166a, 166b. 12 volt DC power is also provided, under certain circumstances, to a coil 168c to actuate relay contacts 168a, 168b. Power may also be supplied to a red visual indicator 175 and a green visual indicator 177 for a dock operator control panel, not shown, and a coil 179 for an outside light relay 179a to energize a flashing red light 180. When relay coil 179 is energized an outside flashing green light 182 is de-energized via relay contact 182a. Lights 180 and 182 are positioned to be viewable by the driver of a truck disposed at the loading dock associated with restraint apparatus 50. The PLC 160 is also operable to provide power to a coil 183 of an interlock relay and to an alarm horn 185. The interlock relay may be used to correlate operation of the apparatus 50 with other devices, not shown. Lastly, PLC 160 is operable to provide a power output signal to a controller 186 for solenoid 126, as shown in FIG. 8B.

A normal operating cycle of the restraint apparatus 50 is such that, when a truck or truck trailer has been backed into a position to be engaged by the restraint apparatus, an operator of the restraint apparatus would actuate switch 170 to cause the PLC 160 to energize relay coil 166c to effect operation of contacts 166a and 166b to energize motor 104 to rotate in a direction which would extend the linearly extensible member 112 and outer tubular sleeve member 62b to raise the arm assembly 54 toward the position shown in FIG. 1. Under this operating condition solenoid 126 is deenergized and biased to hold finger 124 in the retracted position shown in FIG. 5. When the photosensor 99 has its beam interrupted by the presence of the ICC bar between the hook 60 and the reflector 82, the photosensor provides a signal to PLC 160 to de-energize relay coil 166c and energize relay coil 168c to effect movement of the contacts 166a, 166b and 168a, 168b to provide power to motor 104 to reverse its direction of rotation to retract the extensible member 112 and head 116.

During the portion of an operating cycle of the apparatus 50 to raise the articulated arm assembly 54, even though proximity switch 62c senses the presence of the head 116, no output signal is provided to solenoid 126 to rotate the finger 124 into the position shown in FIGS. 6 and 7 if photosensor 99 senses the presence of the ICC bar between hook 60 and reflector 82. Accordingly, when motor 104 has been reversed to retract linearly extensible member 112 and its head 116, the tubular sleeve member 62b remains extended in sleeved relationship over the member 112 and supported by its bearing 114 under the urging of the gas spring 64 so that the arm assembly 54 remains engaged with the truck or truck trailer ICC bar. If at any time during an operating cycle, and when the ICC bar should remain engaged with the arm assembly 54, if the photosensor 99 sends a signal to the PLC 160 that the ICC bar has moved out of a position to interrupt a reflected light signal from reflector 82, the PLC will effect operation of the alarm horn 185 and cause the lights 175 and 180 to be energized indicating an alarm condition.

The PLC 160 is programmable to allow the motor 104 to rotate in the reverse direction to retract the linearly extensible member 112 for a pre-determined period of time to effect movement of the member 112 and its head 116 out of a position which would result in forcible engagement with the pin 84 and the upper end of tubular sleeve member 62b in the event of substantial vertical movement of the truck bed or truck trailer during loading and/or unloading operations. However, when it is desired to retract the articulated arm assembly 54 to "store" the apparatus 50, switch 172 is actuated to cause the PLC 160 to provide suitable signals to relay coils 166 and 168 to cause motor 104 to extend linearly extensible member 112 until head 116 moves into a position to effect operation of proximity switch 62c. A signal from switch 62c under these operating conditions will effect energization of the solenoid 126 via the PLC 160 to rotate latch finger 124 into the position shown in FIGS. 6 and 7. After a suitable time delay beginning with energization of the relay 126 the PLC 160 then effects reversal of the direction of rotation of motor 104 to retract linearly extensible member 112 together with the outer tubular sleeve member 62b toward the position shown in FIGS. 6 and 7 which will retract arm assembly 54 to the stored position shown in FIG. 2.

During normal operation of the control system 150 when the apparatus 50 is in its stored position the outside light 182 is energized and the inside light 175 is deenergized. When the apparatus 50 has been actuated to engage a truck or truck trailer ICC bar and that actuation is successful the lights 177 and 180 are energized. In this way an operator of the apparatus 50 at the loading dock is aware of the condition of the apparatus 50 and a driver of a truck is also aware of the condition of the apparatus 50 to minimize the risk of the truck or truck trailer being driven away when the restraint apparatus is engaged with the ICC bar.

The construction and operation of the restraint apparatus 50 is believed to be readily understandable to one of ordinary skill in the art from the foregoing description. Commercially available components and conventional engineering materials known to those of skill in the art of vehicle restraint apparatus may be used in constructing and operating the apparatus 50. Although a preferred embodiment of a vehicle restraint apparatus in accordance with the invention has been described in detail herein those skilled in the art will also recognize that various substitutions and modifications may be made to the embodiment disclosed without departing from the scope and spirit of the appended claims.

What is claimed is:

1. A vehicle restraint apparatus comprising:

a frame;

an arm assembly supported on said frame and movable between a retracted stored position and an extended position;

an electric actuator operable to move said arm assembly from said stored position to said extended position for engagement with a vehicle to restrain same, said actuator including a first actuator member connected to said arm assembly and a second actuator member, said actuator members being movable relative to each other to provide for retraction of said second actuator member after extension of said arm assembly to allow movement of said arm assembly relative to said frame; and a mechanism operable to provide a releasable connection between said actuator members to provide for retracting said first actuator member and said arm assembly toward said stored position.

2. The apparatus set forth in claim 1 wherein:

said actuator includes a motor drivably connected to a linearly extensible member compromising said second actuator member, said linearly extensible member being extendable and retractable in response to operation of said motor, said first actuator member being engageable with said linearly extensible member for moving said arm assembly from said stored position to an extended position.

3. The apparatus set forth in claim 1 wherein:

said mechanism includes a latch member supported on said first actuator member and operable to be engaged with a part of said second actuator member for moving said first actuator member and said arm assembly toward said stored position.

4. The apparatus set forth in claim 1 wherein:

said actuator comprises a rotatable screw and nut mechanism cooperable to effect linear extension and retraction of said first actuator member.

5. The apparatus set forth in claim 1 including:

a biasing member operable to bias said arm assembly in said extended position in response to retraction of said one actuator member.

6. The apparatus set forth in claim 5 wherein:

said biasing member comprises a linearly extensible gas spring.

7. The apparatus set forth in claim 1 wherein:

said arm assembly comprises an articulated arm assembly including a first arm pivotally connected to said frame and a second arm pivotally connected to said first arm, said first arm being movable relative to said frame and said second arm being movable relative to said frame and said first arm upon operation of said actuator to move said arm assembly between stored and extended positions.

8. The apparatus set forth in claim 1 including:

a control system operably connected to said actuator for energizing a motor of said actuator to move said arm assembly between stored and extended positions, said control system including a controller, a first switch for causing said controller to effect energizing said motor to move said arm assembly to said extended position, and a sensor for detecting operable engagement of said arm assembly with a part of a vehicle to be restrained by said apparatus.

9. The apparatus set forth in claim 8 including:

a second switch operable to effect operation of said controller to cause said motor to extend a linearly extensible member of said apparatus from a retracted position to an extended position followed by operation of said apparatus to effect retraction of said arm assembly from said extended position to said stored position.

10. The apparatus set forth in claim 9 wherein:

said control system includes a switch operable to provide a signal to said controller when said linearly extensible member has been extended to a position to effect retraction of said arm assembly to said stored position.

11. The apparatus set forth in claim 8 including:

a limit switch mounted on said arm assembly and operable to provide a signal to said controller to indicate when said arm assembly is in a retracted position.

12. A vehicle restraint apparatus comprising:

a frame;

an arm assembly supported on said frame and movable between a retracted stored position and an extended position;

an actuator operable to move said arm assembly from said stored position to said extended position for engagement with a vehicle to restrain same, said actuator including actuator members movable relative to each other to provide for retraction of one of said actuator members after extension of said arm assembly to allow movement of said arm assembly relative to said frame;

a motor drivably connected to a linearly extensible member compromising one of said actuator members, said linearly extensible member being extendable and retractable in response to operation of said motor, another of said actuator members being engageable with said linearly extensible member and connected to said arm assembly for moving said arm assembly from a stored position to an extended position; and a mechanism operable to provide a latch connection between said actuator members to provide for retracting said actuator member connected to said arm assembly in response to retraction of said linearly extensible member.

13. The apparatus set forth in claim 12 wherein:

said actuator comprises a rotatable screw and nut mechanism cooperable to effect linear extension and retraction of said linearly extensible member.

14. The apparatus set forth in claim 12 including:

a biasing member operable to bias said arm assembly in said extended position in response to retraction of said one actuator member.

15. The apparatus set forth in claim 14 wherein:

said biasing member comprises a linearly extensible gas spring.

16. The apparatus set forth in claim 12 wherein:

said arm assembly comprises an articulated arm assembly including a first arm pivotally connected to said frame and a second arm pivotally connected to said first arm, said first arm being movable relative to said frame and said second arm being movable relative to said frame and said first arm upon operation of said actuator to move said arm assembly between stored and extended positions.

17. The apparatus set forth in claim 12 including:

a control system operably connected to said actuator for energizing said motor of said actuator to move said arm assembly between stored and extended positions, said control system including a controller, a first switch for causing said controller to effect energizing said motor to move said arm assembly to said extended position, and a sensor for detecting operable engagement of said arm assembly with a part of a vehicle to be restrained by said apparatus, a second switch operable to effect operation of said controller to cause said motor to extend a linearly extensible member of said apparatus from a retracted position to an extended position followed by operation of said apparatus to effect retraction of said arm assembly from said extended position to said stored position and a third switch operable to provide a signal to said controller when said linearly extensible member has been extended to a position to effect retraction of said arm assembly to said stored position.

18. The apparatus set forth in claim 17 including:

a fourth switch mounted on said arm assembly and operable to provide a signal to said controller to indicate when said arm assembly is in a retracted position.

19. A vehicle restraint apparatus comprising:

a frame;

an arm assembly supported on said frame for movement from a retracted stored position generally upwardly with respect to said frame to an extended position for engagement with a vehicle to restrain same from movement away from a loading dock;

an electric actuator connected to said frame and to said arm assembly and operable to move said arm assembly between said stored position and said extended position for engagement with said vehicle, said actuator including an electric drive motor, an elongated rotatable screw member drivingly connected to said drive motor, a first elongated sleeve member disposed in sleeved relationship around said screw member and including a threaded nut threadedly engaged with said screw member, a second elongated sleeve member disposed in sleeved relationship around said first sleeve member and connected to said arm assembly, said first and second sleeve members being responsive to rotation of said screw member in one direction when said arm assembly is in a stored position to extend said arm assembly toward said extended position, said first sleeve member being responsive to rotation of said screw member in an opposite direction to move relative to said second sleeve member to allow said second sleeve member to move in telescoping relationship with respect to said first sleeve member to allow movement of said arm assembly in response to movement of said vehicle in a generally upwardly and downwardly direction with respect to said frame; and a latch member supported on said second sleeve member and adapted to engage said first sleeve member to effect retraction of said sleeve members together to move said arm assembly from said extended position to said stored position.

20. The apparatus set forth in claim 19, including:

a solenoid actuator supported on said second sleeve member and engageable with said latch member for moving said latch member between a position in engagement with said first sleeve member and a position out of engagement with said first sleeve member.

21. The apparatus set forth in claim 19 wherein:

said latch member is mounted for pivotal movement on said second sleeve member between positions for engagement with said first sleeve member and disengagement from said first sleeve member.

22. The apparatus set forth in claim 21 wherein:

said first sleeve member includes a head part connected to a distal end thereof and including a flange portion engageable with said latch member for moving said first sleeve member and said second sleeve member together toward said stored position.

23. The apparatus set forth in claim 19 wherein:

said first sleeve member includes a substantially square cross section bearing part supported thereon and said second sleeve member includes a substantially square cross section bore formed therein for engagement with said bearing part to provide axial extension of said first and second sleeve members in response to rotation of said screw member without rotation of said first and second sleeve members, respectively.

* * * * *